United States Patent
De Sisti et al.

(10) Patent No.: US 6,427,977 B1
(45) Date of Patent: Aug. 6, 2002

(54) LIFTING APPARATUS, PARTICULARLY FOR LIGHTING FITTINGS AND NOT, FOR SHOOTING STUDIOS

(75) Inventors: Mario De Sisti; Fabio De Sisti, both of Cecchina-Albano Laziale (IT)

(73) Assignee: DeSisti Lighting S.p.A. (IT)

(*) Notice: Subject to any disclaimer, the term of this patent is extended or adjusted under 35 U.S.C. 154(b) by 0 days.

(21) Appl. No.: 09/549,437

(22) Filed: Apr. 14, 2000

(30) Foreign Application Priority Data

Apr. 19, 1999 (IT) .................................. RM99A0243

(51) Int. Cl.⁷ ................................................. B66F 3/22
(52) U.S. Cl. .................. 254/122; 254/89 H; 254/93 R; 187/8.5
(58) Field of Search ............................... 254/122, 89 H, 254/8 R, 8 B, 10 R, 8 C, 93 R, 93 H; 187/8.5

(56) References Cited

U.S. PATENT DOCUMENTS

| | | | | |
|---|---|---|---|---|
| 3,915,429 A | * | 10/1975 | Zelli | 254/8 R |
| 4,718,519 A | * | 1/1988 | Barker | 254/122 |
| 4,815,712 A | * | 3/1989 | Kawada | 254/122 |
| 4,848,732 A | * | 7/1989 | Rossato | 254/10 R |
| 5,037,068 A | * | 8/1991 | Grottesi | 254/8 B |
| 5,056,626 A | * | 10/1991 | Mayr | 254/122 |
| 5,375,681 A | * | 12/1994 | Eickmann | 254/122 |

* cited by examiner

Primary Examiner—Joseph J. Hail, III
Assistant Examiner—Daniel Shanley
(74) Attorney, Agent, or Firm—Samuels, Gauthier & Stevens

(57) ABSTRACT

The invention relates to a lifting apparatus, particularly for lighting fittings. The lifting apparatus comprises a pair of pantograph structures which are spaced apart, substantially parallel, and facing each other. The lifting apparatus further includes a suspension coupling and means at the bottom thereof for coupling the fitting to be lifted. Motorization means to operate both the parallelogram structures are provided between the two parallelogram structures. Connection means associated with the motorization means are associated with each one of the parallelogram structures.

6 Claims, 2 Drawing Sheets

Figure 1:
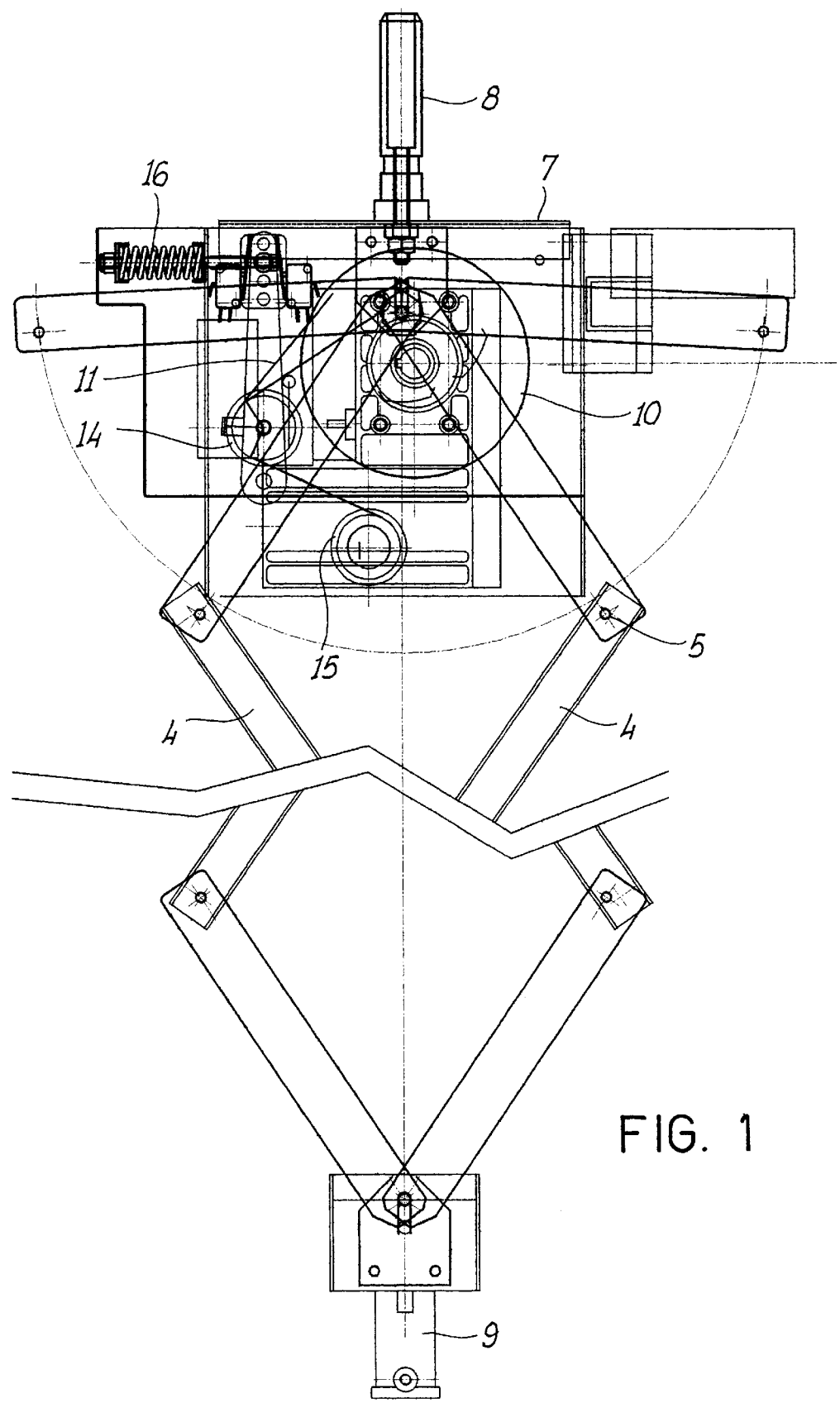

LIFTING APPARATUS, PARTICULARLY FOR LIGHTING FITTINGS AND NOT, FOR SHOOTING STUDIOS

The present invention relates to a lifting apparatus, particularly for lighting fittings and not, for shooting studios.

More specifically, the invention concerns to an apparatus of the above kind allowing to obtain reduced vertical dimensions with respect to the known apparatuses.

As it is well known, in the cinema and/or TV shootings, and particularly those carried out within shooting studios, many fittings are hanging from the ceiling by lifting apparatuses. They mainly are, even if not exclusively, lighting fittings.

Generally, lifting apparatuses are provided with a manually controlled or motorised horizontal motion, as well as with a manually controlled or motorised vertical motion.

Main problem to be faced up using this kind of apparatuses is connected with the fact that it is necessary that, during the shooting, fittings hanged to the same, that must be freely movable in function of the specific shooting needing, are not framed by the telecamera.

Obviously, the above problem is particularly relevant in not too big studios, where the height of the ceiling cannot be too high.

Apparatuses presently used cannot guarantee this kind of performances, since they provide the ratio-motor provided above the lifting structure, often a parallelogram structure, so that even when completely closed, the structure always has a remarkable vertical dimensions.

Another problem of the known apparatuses is that of the stability of the same during its motion, also in view of the weight to be sustained.

In view of the above, the Applicant has realised an apparatus able to solve these and other drawbacks.

Main object of the present invention is that of providing an apparatus allowing to obtain an extremely reduced vertical dimensions.

Further object of the present invention is that of realising an apparatus of the above kind having optimum stability characteristics during its displacement.

Another object of the present invention is that of providing an apparatus so structured to be able to operate using flat lifting ropes that, at the same conditions, allow to us a smaller ratio-motor.

Still another object of the present invention is that of providing a solution having a functionality of the arms to support power and control cables from the fixed part to the movable part.

Another object of the present invention is that of providing an apparatus allowing a complete accessibility of the adjustment and control members.

It is therefore specific object of the present invention a lifting apparatus, particularly for lighting fittings and not, for shooting studios, comprising a pair of pantograph structures, spaced apart, substantially parallel, faced each other, provided on the above with means suspension coupling and at the bottom with means for coupling the fitting to be lifted, motorization means, to operate both said parallelogram structures, provided on the above, between said two parallelogram structures, and connection means of said motorization means with each one of said parallelogram structures.

Preferably, according to the invention, said connection means of said motorization means with each one of said parallelogram structures can be comprised of flat ropes, fixed at the bottom with each one of said parallelogram structures, and above winding about pulleys operatively coupled with said motorization means.

Particularly, the lower fixing of said ropes can be realised on a rocking arm.

Still according to the invention, at least an anti swinging means can be provided between said ropes, along which said ropes slide and integral with said pantograph structure.

Preferably, according to the invention, said motorization means can be comprised of a ratio-motor.

Always according to the invention, reinforcement transverse bars can be provided between said parallelogram structures.

Figure 2:
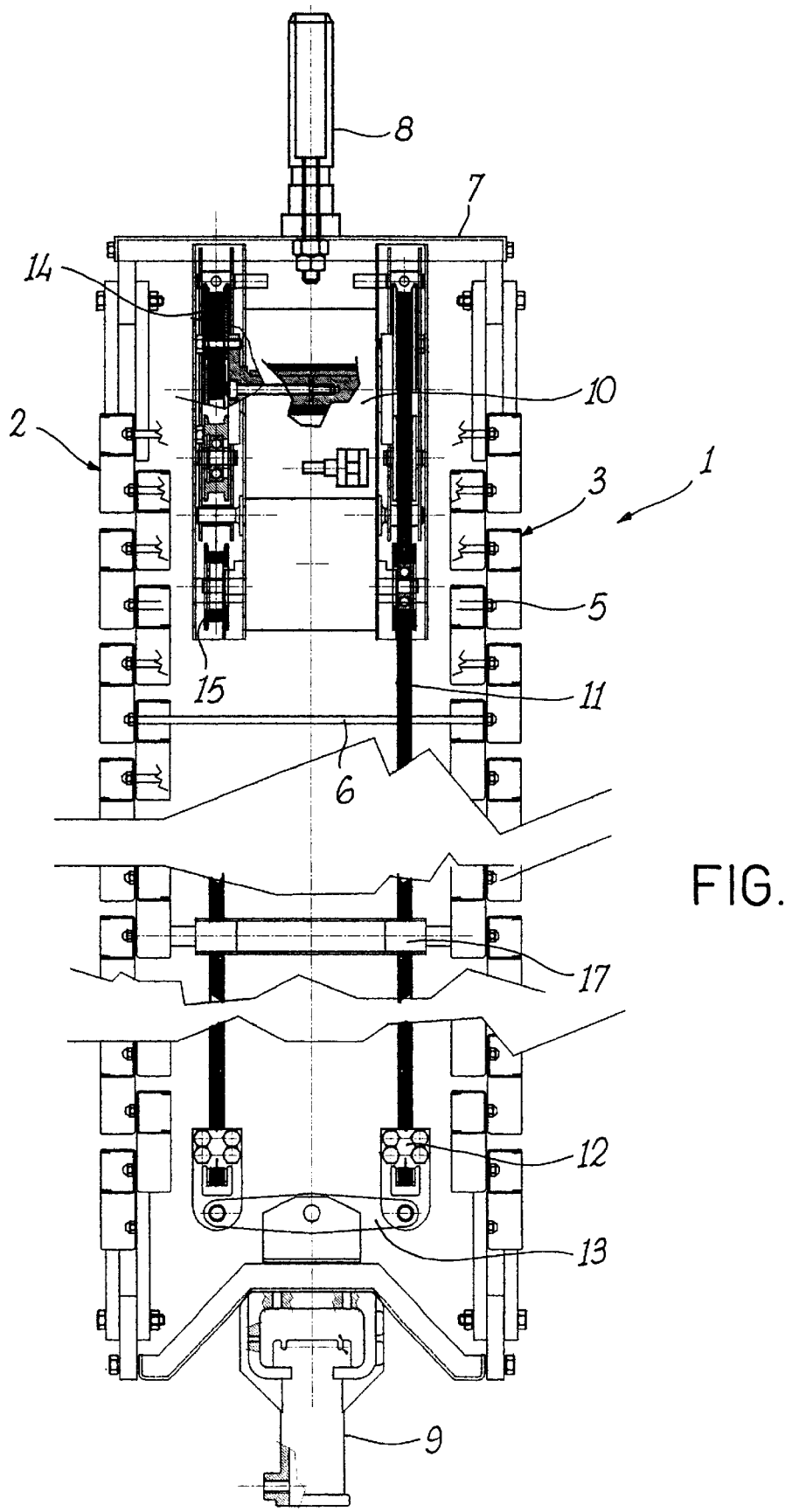

The present invention will be now described, for illustrative but not limitative purposes, according to its preferred embodiments, with particular reference to the figures of the enclosed drawings, wherein:

FIG. 1 is a partially cut-away front view of an apparatus according to the invention; and FIG. 2 is a partially cut-away lateral view of the apparatus of FIG. 1.

Referring to both the figures of the enclosed drawings, it is shown an apparatus 1 according to the invention comprising two substantially parallel pantograph structures 2 and 3, each one comprised of a plurality of arms 4, articulated in the articulation points 5, said structure 2, 3 being connected each other by transverse bars 6.

Above said pantograph structures 2 and 3 a plate 7 is provided, a coupling pin being coupled with the same plate 7 for the suspension of the apparatus 1.

Said apparatus 1 further provides at the bottom a coupling 9 for the fitting to be suspended (not shown), and it is provided with a horizontal movement, obtained by not shown means, said movement being possibly manual or automatic, and with a vertical movement.

Said vertical movement is obtained by a ratio-motor 10, acting on the two pantograph structures 2, 3 by the flat ropes 11, fixed at the bottom to the rocking arm 13 and that wind at the above about the pulley system 14. The lifting system of the apparatus according to the invention is further connected with a control system to control the position 16, that will be not described in further detail since it is not part of the invention.

As it can be noted from the figures, ratio-motor 10 is placed between the two pantograph structures, in such a way to have the minimum dimensions in height, so that when the apparatus 1 according to the invention is closed, the fitting hanging from the same will be in the highest position, and consequently it is prevented the risk that it is framed during the shooting.

By the reference number 17 it is indicated a transverse bar provided between the two flat ropes 11, to stabilise the pantograph structure, thus avoiding side-slips that could occur during the upward and downward motion.

Provision of flat ropes 11 allows to have a much lower thickness of the same about the pulleys, so that, during the lifting action, with a noticeable winding of the ropes, a reduced spacing from the centre is obtained. Consequently, also ratio-motor 10 is positively influenced, being subjected to a reduced torque, so that with the same use conditions it is possible to provide an under dimensioned ratio-motor 10.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. A lifting apparatus particularly for lighting fittings, said lifting apparatus comprises:
   a pair of pantograph structures each being a parallelogram, spaced apart, and being substantially parallel, said pair of pantograph structures having a top and bottom;
   suspension coupling means adjacent to the top of the pantograph structures;
   coupling means at the bottom of the pantograph structures; and
   motorization means to operate the pantograph structures and further including connection means.

2. The lifting apparatus according to claim 1, wherein said motorization means are comprised of a ratio-motor.

3. The lifting apparatus according to claim 1, wherein traverse bars to reinforce the structure are provided between said pantograph structures.

4. The lifting apparatus according to claim 1, wherein said connection means include a flat rope attached to the bottom of each of the parallelograms and pulleys for winding the ropes attached near the top of the pantograph structures.

5. The lifting apparatus according to claim 4, wherein the flat ropes are fixed to the pantograph structures on rocking arms.

6. The lifting apparatus according to claim 4, wherein said apparatus includes at least one anti-swinging mechanism positioned between said ropes, such that said ropes are slidable along the anti-swinging mechanism.

* * * * *